United States Patent [19]
Valvassori et al.

[11] 3,925,333
[45] Dec. 9, 1975

[54] OLEFINIC POLYMERS OF METHYL-TRICYCLO-3,8-DECADIENE

[75] Inventors: Alberto Valvassori, Milan, Italy; Guido Sartori, Roselle, N.J.; Nazzareno Cameli, Milan, Italy

[73] Assignee: The B.F. Goodrich Company, Akron, Ohio

[22] Filed: Feb. 5, 1971

[21] Appl. No.: 113,055

Related U.S. Application Data

[63] Continuation of Ser. No. 868,943, Oct. 23, 1969, abandoned, which is a continuation of Ser. No. 646,468, June 16, 1967, abandoned.

[30] Foreign Application Priority Data
June 17, 1966   Italy ............................... 19149/66

[52] U.S. Cl. ......... 260/79.5 B; 260/80.78; 260/785; 260/793
[51] Int. Cl.$^2$ ..................... C08D 9/00; C08D 3/02
[58] Field of Search ...................... 260/80.78, 79.5

[56]   References Cited
UNITED STATES PATENTS
3,577,393   5/1971   Schrage ........................ 260/80.78

*Primary Examiner*—Christopher A. Henderson, Jr.
*Attorney, Agent, or Firm*—J. Hughes Powell, Jr.

[57]   ABSTRACT

There are disclosed substantially linear, amorphous, unsaturated, vulcanizable, high molecular weight olefinic copolymers, of ethylene, higher alpha-olefins, and at least one of the dienes 3-methyl-tricyclo-[5,2,1,0$^{2,6}$]- 3,8 - decadiene and 4-methyl-tricyclo-[5,2,1,0$^{2,6}$]-3,8-decadiene as well as a process for preparing the same with the aid of catalysts acting through a coordinated anionic mechanism and based on hydrocarbon-soluble vanadium compounds.

8 Claims, No Drawings

OLEFINIC POLYMERS OF METHYL-TRICYCLO-3,8-DECADIENE

CROSS-REFERENCE TO RELATED APPLICATION

This application is a continuation of our application Ser. No. 868,943, filed Oct. 23, 1969, now abandoned, which was a continuation of our parent application Ser. No. 646,468, filed June 16, 1967, now abandoned.

It is known that while the linear, amorphous, elastomeric copolymers of ethylene and a higher alpha-olefin disclosed by Natta et al. can be sulfur-vulcanized under certain conditions, the sulfur-vulcanization is materially facilitated by the inclusion of a copolymerizable polyene which introduces sites of unsaturations into the macromolecules.

Earlier patents and patent applications of our group have disclosed various hydrocarbon dienes or polyenes for copolymerization with the ethylene and higher alpha-olefin, for facilitating the sulfur-vulcanization of the Natta et al elastomeric copolymers.

It has been proposed, also, to use dicyclopentadiene as termonomer of terpolymers which retain the basic characteristics of the Natta et al. copolymers but are more readily vulcanized with sulfur-containing recipes of the kind used in the vulcanization of low-unsaturation rubbers. Those terpolymers have the disadvantage of a low curing rate and the need to use either large amounts of dicyclopentadiene or long vulcanization times, in order to obtain a satisfactory degree of vulcanization.

One object of this invention is to provide a new class of terpolymers which can be cured satisfactorily in a practical time period without using excessive amounts of polyenic termonomer.

Our new terpolymers also retain essentially the characteristics of the Natta et al elastomeric ethylene/higher alpha-olefin copolymers but are modified by polymerized units of a polyene containing unsaturations and providing sites of unsaturation in the macromolecules.

In the present copolymers, the polyene is a diene of the general formula

wherein R is a lower alkyl group. We have found that copolymers of ethylene, at least one higher alpha-olefin, and at least one diene of formula 1 are readily sulfur-vulcanizable under practical conditions to vulcanizates (synthetic rubbers) the mechanical properties of which are superior to those of the ethylene higher alpha-olefin/dicyclopentadiene terpolymers In our new terpolymers, each polymerized unit of the diene having the formula I still contains a free double bond which constitutes an unsaturation or reactivity site for subsequent reactions performed on the copolymer, such as curing of the copolymer by means of compounds of the type commonly used in the vulcanization of unsaturated rubbers. Also, the double bonds present in the macromolecules can, e.g., after oxidation by means of ozone, give rise to polar groups such as, e.g., carbonyl groups which can, in turn, serve as reactive groups for other reactions and be utilized to improve the adhesivity of the copolymers.

Processes for obtaining dienes having the formula I are known. For instance, the dienes of said formula in which R is the $CH_3$ group (3-methyl-tricyclo-[5,2,1,0$^{2,6}$]-3,8-decadiene and 4-methyl-tricyclo-[5,2,1,0$^{2,6}$]-3,8-decadiene) are obtained by codimerization between cyclopentadiene and methyl-cyclopentadiene. Both of said hydrocarbons are present in oil cracking fractions.

The aliphatic alpha-olefin for use in the preparation of the copolymers with ethylene and dienes belonging to the above mentioned class have the general formula $R-CH=CH_2$, wherein R is an alkyl group containing 1 to 6 carbon atoms. Very satisfactory results are obtained when propylene and/or butene-1 are used.

By copolymerizing a mixture of said monomers, under the conditions disclosed below, there is obtained a crude copolymerizate consisting of macromolecules in each of which there are present, in random distribution, units deriving from all the monomers employed.

The copolymers can be defined as having a linear structure, namely, as being substantially free of long branchings. This is demonstrated by the fact that they show properties, for instance a viscous behavior, which are practically identical to those of known linear copolymers, such as linear ethylene/alpha-olefin copolymers.

The new copolymers herein described have molecular weight, viscosimetrically determined, higher than 20,000. In fact, the intrinsic viscosity measured at tetralin at 135°C or in toluene at 30°C is higher than 0.5.

The copolymer composition can be said to be homogeneous, as shown by the fact that well-vulcanized products can be easily obtained according to the techniques conventionally used for curing unsaturated rubbers, preferably rubbers showing a low unsaturation content, such as e.g., butyl rubber. This also demonstrates that the unsaturations are well distributed along the chain. The resulting vulcanizates are completely insoluble in organic solvents, especially in aliphatic hydrocarbons and can be swollen only limitedly by some aromatic solvents; in contrast, the copolymers per se are completely soluble in boiling n-heptane. Furthermore, the vulcanizates have very good mechanical resistance and low permanent sets after breaking. Due to their good mechanical characteristics, the vulcanized products can be advantageously employed for all purposes for which natural and synthetic rubbers are used, such as in the making of pipes, inner tubes, sheets, elastic threads, gaskets.

The copolymers can be extended or plasticized with hydrocarbon oils.

Paraffinic or naphthenic oils are preferably used; however, aromatic oils can be employed.

As compared with known copolymers, especially copolymers of ethylene, alpha-olefins and dicyclopentadiene, the copolymers of the present invention have a higher vulcanization rate. With these copolymers, maximum vulcanization rates can be reached in much shorter times than are required to cure terpolymers containing units of dicyclopentadiene.

The catalytic systems which can be used for preparing the copolymers of this invention are highly dispersed or amorphous colloidally dispersed or completely dissolved in the hydrocarbons which can be employed as copolymerization medium, such as e.g., aliphatic, cycloaliphatic and aromatic hydrocarbons, and are prepared from organometallic compounds of beryllium or aluminum and vanadium compounds.

The organometallic compounds usable in the catalyst preparation are preferably selected from the group consisting of: beryllium dialkyls, beryllium alkylhalides, beryllium diaryls, aluminum trialkyls, aluminum dialkyl monohalides, aluminum monoalkyldihalides, aluminum alkylsesquihalides, aluminum alkenyls, aluminum alkylenes, aluminum cycloalkyls, aluminum cycloalkylalkyls, aluminum aryls, aluminum alkylaryls, complexes of the above mentioned organometallic compounds with preferably weak Lewis bases.

Organometallic compounds in which the metal is linked, by main valences, not only to carbon and/or halogen atoms, but also to oxygen atoms bound to an organic group, such as aluminum dialkylalkoxides and aluminum alkylalkoxyhalides, can also be used.

Non-restrictive examples of organometallic compounds which can be used as one catalyst-forming component include: beryllium dimethyl, beryllium methylchloride, beryllium diethyl, aluminum triethyl, aluminum triisobutyl, aluminum trihexyl, aluminum diethyl monochloride, aluminum diethyl monoiodide, aluminum diethyl monofluoride, aluminum di-isobutyl monochloride, aluminum monoethyldichloride, aluminum ethylsesquichloride, aluminum butenyldiethyl, aluminum isohexenyldiethyl, 1-methyl-1,4 di (di-isobutylaluminum) butane, aluminum tri (dimethylcyclopentylmethyl), aluminum triphenyl, aluminum tritolyl, di (cyclopentylmethyl) aluminum monochloride, diphenylaluminum monochloride, aluminum diisobutylmonochloride complexed with anisole, aluminum monochloro monoethylmonoethoxide, aluminum diethylpropoxide, aluminum diethylamyloxide, aluminum monochloro monopropylmonopropoxide.

Vanadium compounds which are soluble in the hydrocarbons used as copolymerization media are preferably employed in the preparation of the catalyst.

Therefore, halides and oxyhalides (such as e.g. $VCl_4$, $VOCl_3$, $VBr_4$) are used, as well as those compounds in which, at least one of the metal valences is saturated by a heteroatom (namely oxygen or nitrogen) linked to an organic group, such as vanadium triacetylacetonate or tribenzoylacetonate, vanadyl diacetylacetonate and halogen acetylacetonates, trialcoholates and halo alcoholates, and tetrahydrofuranates, etherates, aminates, pyridinates and quinolinates of vanadium tri and tetrachloride and vanadyl trichloride.

Hydrocarbon insoluble vanadium compounds, selected among organic salts such as e.g. vanadium triacetate, tribenzoate and tristearate and inorganic salts, such as $VO_2Cl$ can also be employed.

In practice, it has been found that in order to obtain the best results, the catalytic system used should contain halogen atoms, i.e., systems in which at least one of the catalyst-forming components is halogenated.

The copolymerization can be performed at temperatures ranging from −80° to +125°C. When catalysts prepared from vanadium triacetylacetonate or vanadyl diacetylacetonate, vanadyl halogen acetylacetonates or, generally speaking, from a vanadium compound are used in the presence of aluminum alkylhalides, in order to obtain high copolymer yields by weight unit of catalyst employed, it is convenient to carry out both the catalyst preparation and the copolymerization at temperatures ranging from 0° to −80°C, preferably from −10° to −50°C.

By operating under these conditions, the catalysts show much higher activity than the same catalytic systems prepared and employed at higher temperatures.

Furthermore, in the above mentioned low temperature range, the activity of the catalysts remains practically unchanged with time.

When catalysts prepared from vanadium triacetylacetonate, vanadyl trialcoholates or halogen alcoholates and aluminum alkylhalides are used at temperatures ranging from 0° to 125°C, in order to obtain high copolymer yields, it is convenient to work in the presence of special complexing agents. The complexing agents may be ethers, thioethers, tertiary amines or trisubstituted phosphines containing at least a branched alkyl group or an aromatic nucleus.

The complexing agent can be ether of the formula RYR' where Y is oxygen or sulphur and R and R' each represent a linear or branched alkyl group containing 1 to 14 carbon atoms, or an aromatic group containing from 6 to 14 carbon atoms, at least one of the R and R' being a branched alkyl group or an aromatic group.

The complexing agent can also be a tertiary amine of the formula:

wherein R, R' and R'' each represent an alkyl group containing 1 to 14 carbon atoms or an aromatic nucleus containing 6 to 14 carbon atoms, at least one of the R's being an aromatic nucleus.

The complexing agent can also be a tertiary phosphine of the formula:

wherein R, R' and R'' each designate an alkyl radical containing 1 to 14 carbon atoms or an aromatic nucleus containing 6 to 14 carbon atoms, at least one of the R's being an aromatic nucleus.

The amount of complexing agent is preferably comprised between 0.05 and 1 mol per mol of aluminum alkylhalide.

The activity of the catalysts varies depending on the molar ratio between the catalyst-forming components.

For example, when aluminum trialkyls and vanadium halides or oxyhalides are employed, it is advantageous to use catalysts in which the ratio of aluminum trialkyl mols to vanadium compound mols is from 1 to 5, preferably from 2 to 4. On the other hand, when aluminum diethyl monochloride ($Al(C_2H_5)_2Cl$) and vanadium triacetylacetonate ($VAc_3$) are used as catalyst-forming components, the best results are obtained with a molar ratio of $Al(C_2H_5)_2Cl$ to $VAc_3$ ranging from 2 to 20, preferably from 4 to 10.

The copolymerization can be carried out in an aliphatic, cycloaliphatic or aromatic hydrocarbon solvent, consisting for instance of butane, pentane, n-heptane, cyclohexane, toluene, xylene, or mixtures thereof.

Inert halogenated hydrocarbon solvents can also be employed, for instance chloroform, trichloroethylene, chlorobenzenes, methylene chloride, dichloroethane, tetrachloroethylene etc. Appreciably higher copolymerization rates can be reached by carrying out the copolymerization in the absence of an extraneous solvent and using monomers in the liquid state, for instance by using a solution of ethylene in the mixture of aliphatic olefins and dienes to be copolymerized kept in the liquid state.

In order to obtain copolymers showing a highly homogeneous composition, the ratio between the concentrations of the monomers to be copolymerized, which are present in the reacting liquid phase, has to be maintained constant, or at least as constant as possible.

To this end, it may be convenient to perform the copolymerization in a continuous way by continuously feeding and discharging a monomer mixture having constant composition and by working at high spatial rates.

By varying the composition of the monomer mixture, the composition of the copolymers can be varied within wide limits. When amorphous copolymers of the above mentioned dienes with ethylene and propylene are desired, a molar ratio of propylene to ethylene of at least 4:1 is maintained in the reacting liquid phase. This corresponds to a molar ratio of propylene to ethylene in the gaseous phase of at least 1:1 under normal conditions. Ethylene to propylene molar ratios between 1:200 and 1:4 in the liquid phase are normally preferred.

When butene-1 is employed instead of propylene, a molar ratio of at least 20:1 between the butene and ethylene must be maintained in the liquid phase. This corresponds to a molar ratio between butene-1 and ethylene in the gaseous phase of at least 1.5:1 under normal conditions. Molar ratios of ethylene to butene-1 in the liquid phase of from 1:1000 to 1:20 are normally preferred.

By operating under these conditions, amorphous copolymers are obtained containing less than 75 percent by mols, approximately, of ethylene.

When these values are exceeded, the copolymer shows a crystallinity of polyethylenic type.

The lower limit of ethylene content is not critical; it is however preferable that the copolymer contain at least 5 percent by mols of ethylene. The alpha-olefin content can preferably vary from a minimum of 5 percent by mols to a maximum of 95 percent by mols. The diolefin content in the copolymer is preferably from 0.1 to 20 percent by mols.

This upper limit can be raised, but especially for economic reasons, introduction into the copolymer of a diene content higher than 20 percent by mols is not desirable.

The following examples are intended to illustrate the invention in detail without limiting its scope.

EXAMPLE 1

The reaction apparatus consists of a glass 3,500 cc cylinder of 10 cm diameter, provided with a stirrer and gas inlet and outlet tubes. The inlet tube reaches the vessel bottom and ends in a porous plate (5 cm diameter).

2000 cc anhydrous n-heptane and 1.5 cc of a mixture of 3-methyl-tricyclo-[5,2,1,0$^{2,6}$]-3,8 decadiene and 4-methyl-tricyclo-[5,2,1,0$^{2,6}$]-3, 8 decadiene are introduced into the apparatus kept at the constant temperature of −20°C.

From the gas inlet tube a propylene/ethylene mixture at a molar ratio of 3:1 is injected and circulated at a rate of 1200 Nl/h.

The catalyst is prepared in the presence of the reacting monomers by adding separately to the reactor a solution of 3.75 millimoles aluminum diethyl monochloride in 15 cc n-heptane and 0.5 millimoles vanadium triacetylacetonate dissolved in 15 cc anhydrous toluene.

The propylene/ethylene mixture is continuously fed and discharged at a rate of 1200 Nl/h.

After 15 minutes from the catalyst addition, the reaction is interrupted by addition of 10 cc methanol containing 0.1 g phenyl-beta-naphthylamine. The product is purified by repeated treatments with dilute hydrochloric acid and then with water in a separatory funnel and thereafter coagulated in acetone.

After vacuum drying, 35 g of solid product are obtained, which is amorphous when examined by X-rays, looks like an unvulcanized elastomer, and is soluble in boiling n-heptane.

The analysis by infrared spectrography shows the presence of trisubstituted double bonds (band at 12.5 microns).

The ethylene/propylene molar ratio is approximately equal to 1. 100 parts by weight of this terpolymer are mixed on a laboratory roll mixer with the following ingredients, in part by weight: 50 HAF carbon black, 1 phenyl-beta-naphthylamine, 2 sulphur, 5 zinc oxide, 1 tetramethylthiuramdisulphide and 0.5 mercaptobenzothiazole. The mixture is cured in a press for 60 minutes at 150°C.

A vulcanized sheet is obtained showing the following characteristics:

| | |
|---|---|
| tensile strength | 215 kg/cm$^2$ |
| elongation at break | 425% |
| modulus at 300% | 123 kg/cm$^2$ |
| residual set after break | 12% |

EXAMPLE 2

2000 cc anhydrous n-heptane and 1.5 cc of a mixture consisting of 3-methyl-tricyclo-[5,2,1,0$^{2,6}$]-3,8-decadiene and 4-methyl-tricyclo-[5,2,1,0$^{2,6}$]-3,8-decadiene are introduced into the same apparatus described in Example 1 kept at the constant temperature of −20°C.

From the gas inlet tube a propylene/ethylene mixture at a molar ratio of 3:1 is injected therein and circulated at a rate of 1200 Nl/h.

The catalyst is prepared in the presence of the reacting monomers by adding separately to the reactor a solution consisting of 3.8 millimoles aluminum diethyl monochloride in 15 cc anhydrous n-heptane and an 0.5 millimoles solution of vanadium oxytrichloride in 15 cc n-heptane.

The propylene/ethylene mixture is continuously fed and discharged at a rate of 1200 Nl/h.

About 15 minutes after the introduction of the catalyst, the reaction is interrupted by addition of 10 cc methanol containing 0.1 g phenyl-beta-naphthylamine.

The product is purified and isolated as disclosed in Example 1.

After vacuum drying, 16 g of a solid product are obtained which appears to be amorphous when examined by the X-rays, has the aspect of an unvulcanized elastomer and is completely soluble in boiling n-heptane.

The analysis by infrared spectography shows the presence of trisubstituted double bonds (band at 12.5 microns).

The ethylene to propylene molar ratio is approximately equal to 1.

The terpolymer is vulcanized as in Example 1.

A vulcanized sheet is obtained having the following characteristics:

| | |
|---|---|
| tensile strength | 204 kg/cm² |
| elongation at break | 442% |
| modulus at 300% | 119 kg/cm² |
| residual set at break | 13% |

EXAMPLE 3

The reaction apparatus consists of a 1 liter glass autoclave provided with a stirrer and a gas feeding tube.

500 cc liquid propylene, 5 cc of a mixture of 3-methyl-tricyclo-[5,2,1,0$^{2,6}$]-3,8 decadiene and 4-methyl-tricyclo-[5,2,1,0$^{2,6}$]-3,8 decadiene and 0.125 millimoles zinc diethyl are introduced into the autoclave kept at the constant temperature of −20°C.

Ethylene is added until 1 atm increase of pressure takes place.

The catalyst components are introduced through two separate feeding devices into the reactor, first 0.55 millimoles aluminum diethyl monochloride dissolved in 1.5 cc anhydrous n-heptane and then 0.075 millimoles vanadium triacetylacetonate dissolved in 1.5 cc toluene.

During the polymerization the pressure is maintained constant by feeding in ethylene. After 45 minutes, the reaction is interrupted.

The olefins are removed and the product is purified in a separatory funnel by means of repeated treatments with dilute hydrochloric acid and then with water, and is coagulated in acetone.

After vacuum drying, 25 g of a solid product are obtained, which appears to be amorphous on X-ray examination, has the aspect of an un-vulcanized elastomer and is completely soluble in boiling n-heptane.

The analysis by infrared spectrography shows the presence of trisubstituted double bonds (band at 12.5 microns).

The terpolymer is cured as in Example 1 to obtain a vulcanized sheet having the following characteristics:

| | |
|---|---|
| tensile strength | 225 kg/cm² |
| elongation at break | 320% |
| modulus at 300% | 112 kg/cm² |
| residual set | 10% |

EXAMPLE 4

1,000 cc anhydrous n-heptane and 1.5 cc of a mixture of 3-methyl-tricyclo-[5,2,1,0$^{2,6}$]-3,8-decadiene and 4-methyl-tricyclo-[5,2,1,0$^{2,6}$]-3,8-decadiene are introduced into the reaction apparatus described in Example 1, kept at −20°C.

Through the gas inlet tube, a propylene/ethylene mixture in the molar ratio of 3:1 is introduced and circulated at the flow-rate of 800 Nl/h.

The catalyst is prepared in the presence of the monomers by separately introducing into the reactor a solution of 3.8 millimoles of aluminum diethyl monochloride in 20 cc of n-heptane and a solution of 0.25 millimoles of vanadium triacetylacetonate dissolved in 20 cc of anhydrous toluene.

The propylene/ethylene mixture is continuously fed and discharged at the flow-rate of 800 Nl/h.

About 11 minutes after the introduction of the catalyst, the reaction is stopped by addition of 10 cc of methanol containing 0.1 g of phenyl-beta-naphthylamine. The product is purified and isolated as described in Example 1.

After vacuum drying, 16 g of a solid product which is amorphous by X-ray examination, looks like a non-vulcanized elastomer and is completely soluble in boiling n-heptane are obtained.

The infrared spectrographic examination shows the presence of trisubstituted double bonds (band at 12.5 microns).

The ethylene/propylene molar ratio is about 1:1.

The terpolymer is vulcanized as in Example 1. A vulcanized lamina having the following characteristics is obtained:

| | |
|---|---|
| tensile strength | 247 kg/cm² |
| elongation at break | 400% |
| modulus at 200% | 68 kg/cm² |
| modulus at 300% | 145 kg/cm² |
| permanent set at break | 10% |

As will be apparent, various changes in details may be made in practice in carrying out this invention, without departing from its spirit. Therefore, we intend to include in the scope of the appended claims all those modifications which will be obvious to persons skilled in the art from the description and working examples given herein.

We claim:

1. Substantially linear, amorphous, unsaturated copolymers consisting of macromolecules made up of polymerized units of ethylene, polymerized units of at least one aliphatic 1-olefin of the general formula R — CH = CH$_2$, wherein R is an alkyl group containing 1 to 6 carbon atoms, and polymerized units of at least one of 3-methyl-tricyclo[5,2,1,0$^{2,6}$]-3,8-decadiene and 4-methyl-tricyclo-[5,2,1,0$^{2,6}$]-3,8-decadiene, said copolymers having a molecular weight higher than 20,000 and containing, by mols, from 5 percent to about 75 percent of ethylene, from about 0.1 to about 20 percent of the diene, and the balance aliphatic alpha-olefin.

2. Copolymers according to claim 1, consisting of macromolecules made up of polymerized units of ethylene, polymerized units of propylene or butene-1, and polymerized units of each of the dienes.

3. Copolymers according to claim 1, consisting of macromolecules made up of polymerized units of ethylene, polymerized units of propylene or butene-1, and polymerized units of 3-methyl-tricyclo-[5,2,1,0$^{2,6}$]-3,8-decadiene.

4. Copolymers according to claim 1, consisting of macromolecules made up of polymerized units of ethylene, polymerized units of propylene or butene-1, and polymerized units of 4-methyl tricyclo [5,2,1,0$^{2,6}$]-3,8-decadiene.

5. An elastomeric interpolymer of ethylene, an aliphatic 1-olefin of the formula R—CH=CH$_2$ wherein R is an alkyl group containing 1–6 carbon atoms, and a compound defined as

 and/or 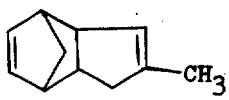

said compound being present in an amount sufficient to impart sulfur vulcanizability, and said interpolymer having an intrinsic viscosity higher than 0.5 when measured in tetralin at 135°C. or in toluene at 30°C.

6. An interpolymer according to claim 5 wherein the olefin is propylene.

7. The sulfur vulcanizate of the elastomeric interpolymer of claim 5.

8. The sulfur vulcanizate of the elastomeric interpolymer of claim 6.

* * * * *